2,998,427
POLYMERS CONTAINING SULFIDE AND SPIROBI(META-DIOXANE) GROUPS

Harry A. Stansbury, Jr., South Charleston, and Howard R. Guest, Charleston, W. Va., assignors to Union Carbide Corporation, a corporation of New York
No Drawing. Filed July 16, 1957, Ser. No. 672,115
5 Claims. (Cl. 260—340.7)

This invention relates to novel spirobi(meta-dioxane) containing polymers and their preparation. In one aspect, this invention relates to a method of producing polymers containing spirobi(meta-dioxane) and sulfur groups. In another aspect, this invention relates to a method for producing polymers containing substituted spirobi(meta-dioxane) groups connected by sulfide linkages which are useful as intermediate reactants and as accelerators for curing rubber.

It is an object of the present invention to provide polymers which contain spirobi(meta-dioxane) connected through sulfide linkages.

It is a further object of this invention to provide spirobi(meta-dioxane) and sulfur-containing polymers which have active sites that can react under suitable conditions.

Other object and advantages of the present invention will become apparent to those skilled in the art from the following description.

According to this invention, it has been discovered that novel polymers containing spirobi(meta-dioxane) and thioether groups may be obtained by reacting together hydrogen sulfide and a 3,9-divinylspirobi(meta-dioxane) having the formula:

$$D-CH \underset{OCH_2}{\overset{OCH_2}{\diagdown}} C \underset{CH_2O}{\overset{CH_2O}{\diagup}} HC-D$$

wherein D is selected from the group consisting of (R—CH=CH—) and $$(CH_2=\overset{R}{\underset{|}{C}}-)$$

and R is selected from the group consisting of hydrogen and lower alkyl.

The 3,9-divinylspirobi(meta-dioxane) compounds which are conveniently and economically prepared from widely available starting materials are those which are unsubstituted or have a methyl substituted on each vinyl group. Such 3,9-divinylspirobi(meta-dioxane) compounds are produced by the reaction of pentaerythritol with acrolein, methacrolein and crotonaldehyde, respectively.

3,9-divinylspirobi(meta-dioxane) compounds which contain a terminal methylene group are of particular advantage for ease of reaction, quality of product, etc. Their use, therefore, generally is the most preferred.

The preferred 3,9-divinylspirobi(meta-dioxane) starting materials of this present invention may be prepared by the condensation of a mole of pentaerythritol with two moles of acrolein or an acrolein derivative in the presence of an acid catalyst such as p-toluenesulfonic acid. This will known synthetic method is published in detail in Schulz and Wagner, Angew. Chemie, 62, 118 (1950), and in German Patents 858,406; 870,032 and 885,006.

The 3,9-divinylspirobi(meta-dioxane) compounds which contain terminal methylene groups are derived from the reaction of pentaerythritol with α,β-unsaturated aldehydes such as acrolein, alpha-methylacrolein, alpha-ethylacrolein, alpha-propylacrolein, alpha-butylacrolein, etc.

When acrolein is used, an unsubstituted 3,9-divinylspirobi(meta-dioxane) is obtained:

$$2CH_2=CHCHO + \underset{HOCH_2}{\overset{HOCH_2}{\diagdown}} C \underset{CH_2OH}{\overset{CH_2OH}{\diagup}} \xrightarrow{H+}$$

$$CH_2=CHCH \underset{OCH_2}{\overset{OCH_2}{\diagdown}} C \underset{CH_2O}{\overset{CH_2O}{\diagup}} CHCH=CH_2 + 2H_2O$$

When the condensation is conducted with (a) alpha-methyl acrolein or (b) crotonaldehyde, then methyl-substituted 3,9-divinylspirobi(meta-dioxanes) are obtained:

(a)

$$2CH_2=\overset{CH_3}{\underset{|}{C}}CHO + \underset{HOCH_2}{\overset{HOCH_2}{\diagdown}} C \underset{CH_2OH}{\overset{CH_2OH}{\diagup}} \xrightarrow{H+}$$

$$CH_2=\overset{CH_3}{\underset{|}{C}}CH \underset{OCH_2}{\overset{OCH_2}{\diagdown}} C \underset{CH_2O}{\overset{CH_2O}{\diagup}} CH\overset{CH_3}{\underset{|}{C}}=CH_2 + 2H_2O$$

(b)

$$2CH_3CH=CHCHO + \underset{HOCH_2}{\overset{HOCH_2}{\diagdown}} C \underset{CH_2OH}{\overset{CH_2OH}{\diagup}} \xrightarrow{H+}$$

$$CH_3CH=CHCH \underset{OCH_2}{\overset{OCH_2}{\diagdown}} C \underset{CH_2O}{\overset{CH_2O}{\diagup}} CHCH=CHCH_3 + 2H_2O$$

It is not necessary that the α,β-unsaturated aldehyde reacted with pentaerythritol be pure or a single species. Mixtures of α,β-unsaturated aldehydes may be condensed with pentaerythritol for purposes of convenience and economy. The resulting products are mixtures of 3,9-divinylspirobi(meta-dioxane) compounds which may be used in their crude form directly in the processes of this invention.

As previously mentioned, novel and useful polymers are obtained by reacting together hydrogen sulfide and a 3,9-divinylspirobi(meta-dioxane). The reaction occurs essentially as shown in the following typical reaction using 3,9-(α,α'-dimethyl)divinylspirobi(meta-dioxane) as a reactant:

$$H_2S + CH_2=\overset{CH_3}{\underset{|}{C}}CH \underset{OCH_2}{\overset{OCH_2}{\diagdown}} C \underset{CH_2O}{\overset{CH_2O}{\diagup}} CH\overset{CH_3}{\underset{|}{C}}=CH_2 \longrightarrow$$

$$CH_2=\overset{CH_3}{\underset{|}{C}}CH \underset{OCH_2}{\overset{OCH_2}{\diagdown}} C \underset{CH_2O}{\overset{CH_2O}{\diagup}} CHC_3H_6-\left[SC_3H_6CH \underset{OCH_2}{\overset{OCH_2}{\diagdown}} C \underset{CH_2O}{\overset{CH_2O}{\diagup}} CHC_3H_6\right]_n-SH$$

The novel polymers of this invention formed by the interaction of hydrogen sulfide and 3,9-divinylspirobi(meta-dioxane) compounds have the general formula:

$$\left[-S-Z-CH \underset{OCH_2}{\overset{OCH_2}{\diagdown}} C \underset{CH_2O}{\overset{CH_2O}{\diagup}} HC-Z-\right]_n$$

wherein Z is selected from the group consisting of $$\left(-\overset{R}{\underset{|}{CH}}-CH_2-\right)$$

and

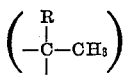

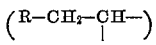

R being selected from the group consisting of hydrogen and lower alkyl; and $n$ is an integer which can vary between 2 and 20.

The polymerization reactions of this present invention may be carried out in a batchwise or continuous manner, either with a solvent present or without it. The mole ratio of hydrogen sulfide to divinylspirobi(meta-dioxane) compound may vary from 1:1 to 20:1. In a preferred embodiment, a large excess of hydrogen sulfide is desirable, with a practical range being between 3 and 15 moles of hydrogen sulfide for every mole of divinylspirobi(meta-dioxane) compound.

The polymerization reaction temperature may vary from about 180° C. to about 280° C., with 200° C. to 250° C. being the preferred range. The reaction does not proceed at a satisfactory rate below 180° C. The pressure may be varied over a wide range, but for ordinary purposes it is practical to allow the reactants to interact under autogenous pressure. Depending on the temperature and pressure applied to the reaction medium, the reaction time may vary from about 0.1 hour to about 10 hours. To a large extent the polymerization conditions of temperature, pressure, concentration and reaction time will depend on the particular 3,9-divinylspirobi(meta-dioxane) being reacted and the technique used. It is the general observation that the molecular weight of the polymers increases if the reaction temperature is increased or if the reaction is conducted for a longer period of time.

The polymerization reactions may be conducted in a solvent medium if desired. A variety of common inert solvents are useful for this purpose. The particular solvent used depends on the solubilities of the starting materials and reaction products. Solvents that are of general applicability comprise benzene, toluene, cyclohexane, heptane, dibutyl ether, di-2-hexyl ether, decalin, etc.

The products of this invention have chemical and commercial application. Some of their foremost utilities include their use as accelerators for curing rubber and as intermediates in the production of other chemicals.

The following examples illustrate some typical embodiments of this invention.

Example 1

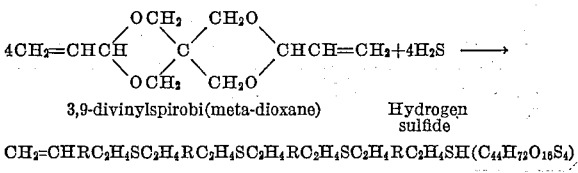

where R is

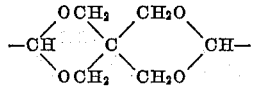

A mixture of 3,9-divinylspirobi(meta-dioxane) (212 grams, 1 mole) and hydrogen sulfide (272 grams, 8 moles) was placed in a three liter, stainless steel rocking autoclave. The mixture was heated for 2 hours at 200° C. under an autogenous pressure of 1800 p.s.i.g.

The crude reaction mixture was dissolved in benzene and heated at 120° C./2 mm. to remove the solvent and unreacted starting material. A glassy residue (214 grams) was recovered which had a melting range of 90–100° C. Elemental analysis gave values which approximated the product shown in the above reaction scheme.

*Analysis.*—Calc. for $C_{44}H_{72}O_{16}S_4$ (984): C, 53.7; H, 7.4; S, 13.0. Found: C, 50.0; H, 7.1; S, 15.5. Molecular weight calculated: 984. Found by Menzies-Wright method: 1015.

Example 2

A mixture of 3,9-divinylspirobi(meta-dioxane) (212 grams, 1 mole) hydrogen sulfide 272 grams, 8 moles) and benzene (212 grams) was placed in a three liter, stainless steel rocking autoclave. The mixture was heated for 15 minutes at 250° C. under an autogenous pressure of 1400 p.s.i.g., then the reaction mixture components which were volatile at a temperature of 120° C./11 mm. were removed. A non-brittle, tacky solid (254 grams) was recovered as a residual product. This material contained 14.9% sulfur, and had a molecular weight of 878 by the Menzies-Wright method.

Example 3

The same charge was used as that described in Example 2. After a reaction period of 30 minutes at 200° C. under an autogenous pressure of 900 p.s.i.g., the reaction mixture components which were volatile at 130° C./5 mm. were removed and a residual product was recovered (225 grams). This material contained 6.5% sulfur and had a molecular weight of 271 by the Menzies-Wright method.

Example 4

A mixture of 3,9-divinylspirobi(meta-dioxane) (212 grams, 1.0 mole), benzene (212 grams) and hydrogen sulfide (333 grams, 9.5 moles) was heated at 200° C. for 3 hours under an autogenous pressure of 1300 p.s.i.g. The reaction mixture components which were volatile at 135° C./15 mm. were removed and a residual product was recovered (236 grams). This material contained 14.3% sulfur and had a molecular weight of 1605 by the Menzies-Wright method.

Example 5

This example illustrates the use of the products of this invention as effective accelerators for curing rubber. The formulations were compounded 5 minutes at 75° C. on a two-roll mill.

(a) 100 grams natural rubber (smoked sheet)
    1 gram "Agerite" powder
    5 grams zinc oxide
    2 grams sulfur
    3 grams stearic acid
    50 grams "Kosmobile 77EPC" carbon black
(b) Same as (a) +1 gram of product described in Ex. 1.
(c) Same as (a) +1 gram of product described in Ex. 2.
(d) Same as (a) +1 gram of product described in Ex. 3.
(e) Same as (a) +1 gram of product described in Ex. 4.
(f) Same as (a) +1 gram divinylspirobi(meta-dioxane).

PHYSICAL PROPERTIES ON SPECIMENS CURED (VULCANIZED) AT 140° C. in 5¼ INCH POSITIVE MOLDS FOR 60 MINUTES

| Prod. of Ex. No. | Control | 1 | 2 | 3 | 4 |  |
|---|---|---|---|---|---|---|
| Molecular Weight |  | 1,015 | 878 | 271 | 1,605 | 212 |
| Percent Sulfur |  | 15.5 | 14.9 | 6.5 | 14.3 | 0 |
| Formulation | (a) | (b) | (c) | (d) | (e) | (f) |
| Tensile, p.s.i. | 380 | 1,275 | 1,150 | 910 | 775 | 550 |
| Elongation, percent | 375 | 480 | 430 | 400 | 420 | 375 |
| Load at 300% Elong., p.s.i. | 200 | 530 | 600 | 550 | 450 | 380 |
| Hardness, Durometer A | 14 | 44 | 38 | 35 | 36 | 34 |

Having thus provided a description of our invention, including specific examples thereof, it should be understood that no undue limitations or restrictions are to be imposed by reason thereof, and various alterations and modifications may become obvious to those skilled in the art without departing from the scope thereof.

Having described our invention, we claim:

1. The class of novel polymers of the formula:

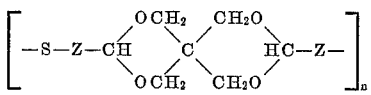

wherein Z is selected from the group consisting of

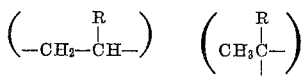

and

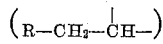

R being selected from the group consisting of hydrogen and lower alkyl; and $n$ is an integer which can vary between 2 and 20.

2. A process for producing sulfur-containing polymers which comprises reacting together hydrogen sulfide and a 3,9-divinylspirobi(meta-dioxane) of the formula:

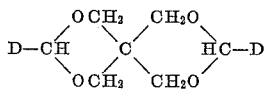

wherein D is selected from the group consisting of R—CH=CH— and

and R is selected from the group consisting of hydrogen and lower alkyl, a mole ratio between about 1:1 and 20:1 at a temperature between about 180° C. and 280° C.

3. A process for producing low-molecular weight sulfur-containing polymers which comprises reacting together hydrogen sulfide and 3,9-divinylspirobi(meta-dioxane) in a mole ratio of between about 3:1 and 15:1 at a temperature between about 200° and 250° C. for a period of time between 0.1 and 10 hours.

4. A composition of matter of the formula:

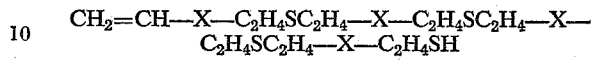

wherein X is

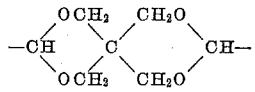

5. A composition of matter of the formula:

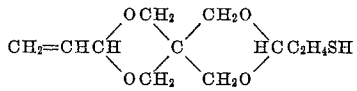

References Cited in the file of this patent
UNITED STATES PATENTS

| | | |
|---|---|---|
| 2,325,735 | Blake | Aug. 3, 1943 |
| 2,343,566 | Mathes | Mar. 7, 1944 |
| 2,389,662 | Fisher et al. | Nov. 27, 1945 |
| 2,517,564 | Harman et al. | Aug. 8, 1950 |
| 2,563,383 | Vaughan et al. | Aug. 7, 1951 |
| 2,720,509 | Dees | Oct. 11, 1955 |
| 2,915,499 | Wilson et al. | Dec. 1, 1959 |